United States Patent
Liu et al.

(10) Patent No.: US 12,065,708 B2
(45) Date of Patent: Aug. 20, 2024

(54) COAXIAL DUAL SUPERSONIC SPEED OXYGEN FLOW COHERENT OXYGEN LANCE

(71) Applicant: CISDI Engineering Co., Ltd., Chongqing (CN)

(72) Inventors: Xiangdong Liu, Chongqing (CN); Weijiang Yu, Chongqing (CN); Hangliang Tian, Chongqing (CN); Qiuqiang Shi, Chongqing (CN); Kunxian Ren, Chongqing (CN)

(73) Assignee: CISDI Engineering Co., Ltd., Chongqing (CN)

( * ) Notice: Subject to any disclaimer, the term of this patent is extended or adjusted under 35 U.S.C. 154(b) by 0 days.

(21) Appl. No.: 17/617,947

(22) PCT Filed: Sep. 25, 2019

(86) PCT No.: PCT/CN2019/107822
§ 371 (c)(1),
(2) Date: Dec. 10, 2021

(87) PCT Pub. No.: WO2020/173088
PCT Pub. Date: Sep. 3, 2020

(65) Prior Publication Data
US 2023/0015434 A1 Jan. 19, 2023

(30) Foreign Application Priority Data
Feb. 27, 2019 (CN) .......................... 201910146309.4

(51) Int. Cl.
*C21C 5/46* (2006.01)
*C21C 5/52* (2006.01)

(52) U.S. Cl.
CPC .............. *C21C 5/4606* (2013.01); *C21C 5/52* (2013.01)

(58) Field of Classification Search
None
See application file for complete search history.

(56) References Cited

FOREIGN PATENT DOCUMENTS

CN 201476583 U * 5/2010

* cited by examiner

Primary Examiner — George Wyszomierski
Assistant Examiner — Nikolas Takuya Pullen
(74) Attorney, Agent, or Firm — Michael D. Eisenberg

(57) ABSTRACT

A coaxial dual supersonic oxygen flow cluster oxygen lance comprises an inner layer circular-hole supersonic nozzle assembly, an outer layer water-cooled casting assembly, and a middle layer annular-hole supersonic nozzle assembly arranged between the inner layer circular-hole supersonic nozzle assembly and the outer layer water-cooled casting assembly, wherein the circular-hole supersonic assembly generates a first beam of supersonic oxygen jets and the annular-hole supersonic assembly generates a second beam of supersonic oxygen jets surrounding the first beam of supersonic oxygen jets; and the second beam of supersonic oxygen jets and the first beam of supersonic oxygen jets are in the same direction, and the two beams of supersonic oxygen jets are independently supplied with gas, and are independently adjusted. The oxygen lance can form coaxial dual supersonic oxygen flow, can flexibly adjust the flow of the oxygen lance under the condition of supersonic jets, and can meet the different requirements of an electric furnace at high steel scrap ratio for an oxygen system during smelting periods at different working conditions, thereby improving smelting efficiency of the electric furnace, reducing consumption and shortening smelting periods.

8 Claims, 3 Drawing Sheets

COAXIAL DUAL SUPERSONIC SPEED OXYGEN FLOW COHERENT OXYGEN LANCE

FIELD OF INVENTION

The present invention belongs to the technical field of metallurgy, and particularly relates to a coaxial dual supersonic oxygen flow cluster oxygen lance.

BACKGROUND ART OF THE INVENTION

Electric furnace smelting at a high hot metal ratio refers to an electric furnace smelting process in which more than 50-90% of molten irons are added into an electric furnace, and less than 200 KW of power consumption per ton of steel can be obtained by using an oxygen lance to blow a large amount of oxygen into a molten pool, even without heating electrodes. The electric furnace smelting at a high hot metal ratio is an advanced and efficient steelmaking process for modern electric furnaces, and the smelting cycle has reached within 32 min/furnace. In the steelmaking process of electric furnaces, dephosphorization and decarburization are chemical reactions occurring in two different temperature zones. How to dephosphorize high phosphorus molten irons to a very low value economically and efficiently and produce products with high added value is a difficult problem for the existing electric furnace smelting at a high hot metal ratio. The dephosphorization is mainly realized by lime slag formation and generates ferric oxide as supersonic oxygen enters into molten steel such that the lime can rapidly form foam slag, improving the dephosphorization rate. But, excessive use of oxygen will increase the temperature of molten irons rapidly and block the progress of dephosphorization.

Meanwhile, high-efficiency decarburization requires blowing a large amount of oxygen into the molten steel at a high speed, stirring the molten steel vigorously, shortening the periods of the electric furnace smelting at a high hot metal ratio, and matching with a high speed conticaster.

Although a cycle-gas cluster carbon oxygen lance structure which enhances the function of a burner of the oxygen lance of the electric furnace is disclosed in the prior art, the structure is only suitable for smelting processes of electric furnaces at a full steel scrap ratio or at a high steel scrap ratio and cannot meet smelting requirements for the electric furnace at a high hot metal ratio.

A converter oxygen lance is also disclosed in the prior art, wherein a dephosphorization powder injection oxygen lance and a decarbonization dual flow oxygen lance are provided with an auxiliary oxygen flow channel positioned at the center and a main oxygen flow channel positioned at the periphery of the auxiliary oxygen flow channel. But, in order to adapt to converter smelting, this kind of oxygen lance employs a multi-spout structure with a certain deflection angle, which is not suitable for working conditions of electric furnace smelting.

It can be seen that the electric furnace steelmaking at a high hot metal ratio needs to adopt different oxygen blowing systems at different working conditions when oxygen is used. Therefore, it is necessary to develop a high-efficiency oxygen lance with dual flow speeds. At present, such a coaxial supersonic long-jet dual flow speed oxygen lance which is suitable for the electric furnaces at a high hot metal ratio has not yet appeared in China.

DISCLOSURE OF THE INVENTION

In view of the above defects in the prior art, the purpose of the present invention is to provide a coaxial dual supersonic oxygen flow cluster oxygen lance to realize high efficiency oxygen usage of an electric furnace at a high hot metal ratio.

To achieve the above purpose and other relevant purposes, the present invention adopts the following technical solution:

A coaxial dual supersonic oxygen flow cluster oxygen lance, comprising an inner layer circular-hole supersonic nozzle assembly, an outer layer water-cooled casting assembly, and a middle layer annular-hole supersonic nozzle assembly arranged between the inner layer circular-hole supersonic nozzle assembly and the outer layer water-cooled casting assembly, wherein the circular-hole supersonic assembly generates a first beam of supersonic oxygen jets and the annular-hole supersonic assembly generates a second beam of supersonic oxygen jets surrounding the first beam of supersonic oxygen jets; and the second beam of supersonic oxygen jets and the first beam of supersonic oxygen jets are in the same direction, and the two beams of supersonic oxygen jets are independently supplied with gas and are independently adjusted.

By adopting the above structure, single beams of the second beam of supersonic oxygen jets and the first beam of the supersonic oxygen jets are in the same direction, all the second beam of supersonic oxygen jets are centered with the first beam of supersonic oxygen jets and distributed on a periphery of the first beam of supersonic oxygen jets to form coaxial dual supersonic oxygen flow, and the two beams of supersonic oxygen jets are independently supplied with gas and independently adjust respective gas pressure and flow, such that the flow of the oxygen lance under the condition of supersonic jets can be adjusted flexibly and the different requirements of an electric furnace at high steel scrap ratio for an oxygen system during smelting periods at different working conditions can be met, thereby improving smelting efficiency of the electric furnace, reducing consumption and shortening smelting periods. The cluster supersonic jets can be realized at various flow rates, which prolong the jet distance of oxygen and enable the oxygen lance to be installed at a higher position from a molten steel level, thus reducing the damage of high temperature radiation and slag liquid to the lance and prolonging service life of the oxygen lance.

Optionally, the inner layer circular-hole supersonic nozzle assembly comprises a Lavalle spray head and a first oxygen supply pipe welded with the Lavalle spray head; and the first oxygen supply pipe forms a first oxygen channel, and an inner profile surface of the Lavalle spray head forms a supersonic spout which is used for generating the first beam of supersonic oxygen jets;

Optionally, the middle layer annular-hole supersonic nozzle assembly comprises an annular-hole spray head and a second oxygen supply pipe welded with the annular-hole spray head; and the second oxygen supply pipe is coaxially sleeved on a periphery of the first oxygen supply pipe to form a second oxygen channel, the Lavalle spray head is inserted into the annular-hole spray head, an upper cavity of a circular ring cone gradually reducing a cross sectional area and a lower cavity of the circular ring cone gradually expanding a cross sectional area are formed between an inner profile of the annular-hole spray head and an outer profile of the Lavalle spray head in an airflow direction, the upper cone cavity and the lower cone cavity with variable cross sectional area are connected by a plurality of independent oxygen slotted holes with equal cross sectional area, the plurality of independent oxygen slotted holes are centered with an axis of an upper and a lower cones, and the upper cavity of the circular ring cone, the oxygen slotted holes and the lower cavity of the circular ring cone form a supersonic spout of the annular-hole spray head, which is used for generating the second beam of supersonic oxygen jets.

Optionally, the oxygen slotted holes are radially distributed as at least two layers along the annular-hole spray head.

Optionally, the outer layer water-cooled casting assembly comprises a water-cooled inner pipe, a middle casting, a water-cooled outer pipe and an annular seal head, the water-cooled inner pipe and the water-cooled outer pipe are respectively welded with inner and outer surfaces of the annular seal head, the middle casting is separated from a water inlet channel and a water return channel, the annular-hole spray head is inserted into the annular seal head, and a gas channel is formed between the second oxygen supply pipe and the water-cooled inner pipe.

Optionally, an outer profile of the annular-hole spray head is provided with gas slotted holes for gas outflow along the direction parallel to the axis, and the gas slotted holes are circumferentially distributed along the annular-hole spray head and are in communication with the gas channel.

Optionally, the water-cooled inner pipe can slide relative to the water-cooled outer pipe, and an O-shaped sealing ring is passed through between the water-cooled outer pipe and the water-cooled inner pipe.

Optionally, the annular-hole spray head, the Lavalle spray head and the sealing head are all made of copper.

Optionally, the coaxial dual supersonic oxygen flow cluster oxygen lance further comprises a tail pipe, wherein the tail pipe is coaxially arranged outside the first oxygen supply pipe and the second oxygen supply pipe, a first end of the tail pipe is connected to and the water-cooled outer pipe through a first sealing flange, a second end is connected with a second sealing flange for sealing, the first oxygen supply pipe passes through and is supported on the second sealing flange, and the tail pipe is connected with an oxygen inlet and a gas inlet which are separated from each other; and the gas inlet is communicated with the gas channel, and the oxygen inlet is communicated with the second oxygen channel.

Optionally, the inner wall of the tail pipe is provided with a spacing ring for separating the gas inlet and the oxygen inlet, and the second oxygen supply pipe is inserted into the spacing ring and is welded with the spacing ring.

The present invention has the following beneficial effects: the present invention can form coaxial dual supersonic oxygen flow, can flexibly adjust the flow of the oxygen lance under the condition of supersonic jets, and can meet the different requirements of an electric furnace at high scrap ratio for an oxygen system during smelting periods at different working conditions, thereby improving smelting efficiency of the electric furnace, reducing consumption and shortening smelting periods. The cluster supersonic jets can be realized at various flow rates, which prolong the jet distance of oxygen and enable the oxygen lance to be installed at a higher position from a molten steel level, thus reducing the damage of high temperature radiation and slag liquid to the lance and prolonging service life of the oxygen lance.

DESCRIPTION OF PART MARKS

11—Lavalle Spray Head; 12—First Oxygen Supply Pipe; 21—Annular-hole Spray Head; 22—Second Oxygen Supply Pipe; 23—Oxygen Slotted Hole; 24—Epoxy Circular Hole; 25—Gas Slotted Hole; 26—Upper Cavity of Cone; 27—Lower Cavity of Cone; 31—Annular Seal Head; 32—Water-cooled Inner Pipe; 33—Middle Casting; 34—Water-cooled Outer Pipe; 35—Water Inlet Pipe; 36—Water Outlet Pipe; 41—Tail Pipe; 42—Spacing Ring; 43—Oxygen Inlet; 44—Gas Outlet; 45—First Sealing Flange; 46—Second Sealing Flange; 47—O-shaped Sealing Ring; 48—First Oxygen Inlet; A—First Oxygen Channel; B—Second Oxygen Channel; C—Gas Channel.

DETAILED DESCRIPTION OF THE INVENTION

Embodiments of the present invention are described below through specific embodiments. Those skilled in the art can understand other advantages and effects of the present invention easily through the disclosure of the description.

Meanwhile, terms such as "upper", "lower", "left", "right", "middle", "an", etc. cited in the description are only used for clear illustration, not intended to limit the implementation scope of the present invention. Change or adjustment of relative relationships shall be included in the implementation scope of the present invention without substantially changing the technical contents.

Figure 1:
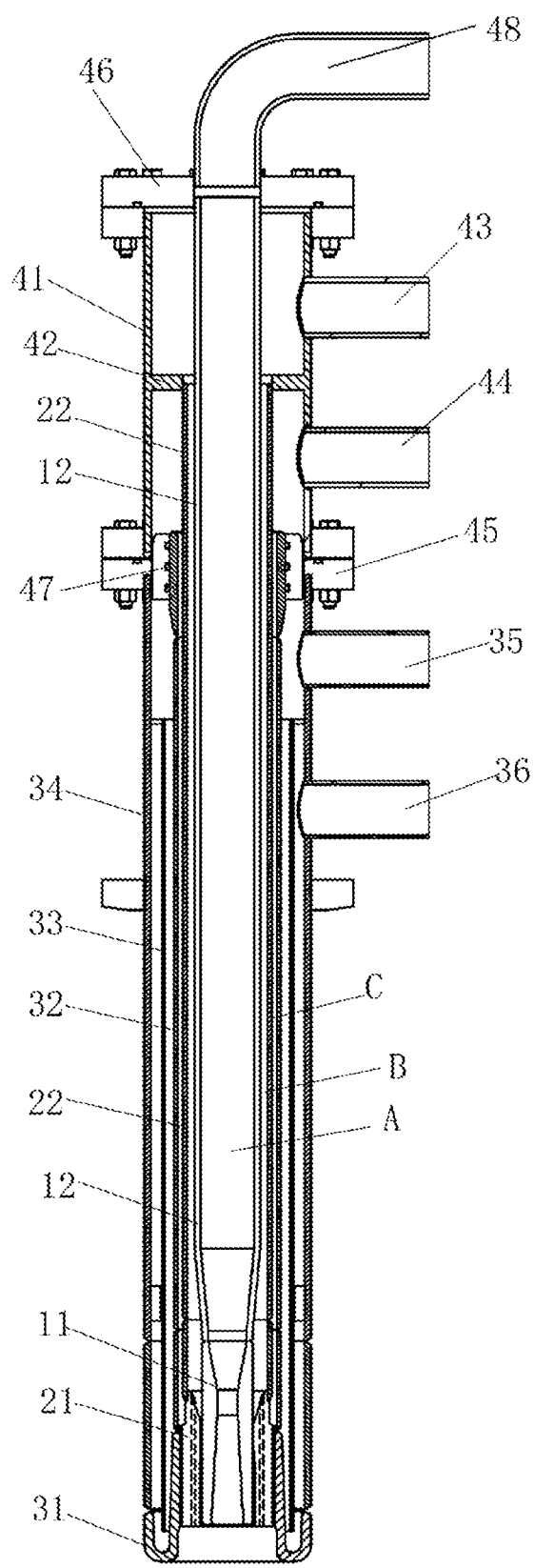
FIG. 1 is a structural schematic diagram of an oxygen lance of the present invention.
Figure 2:
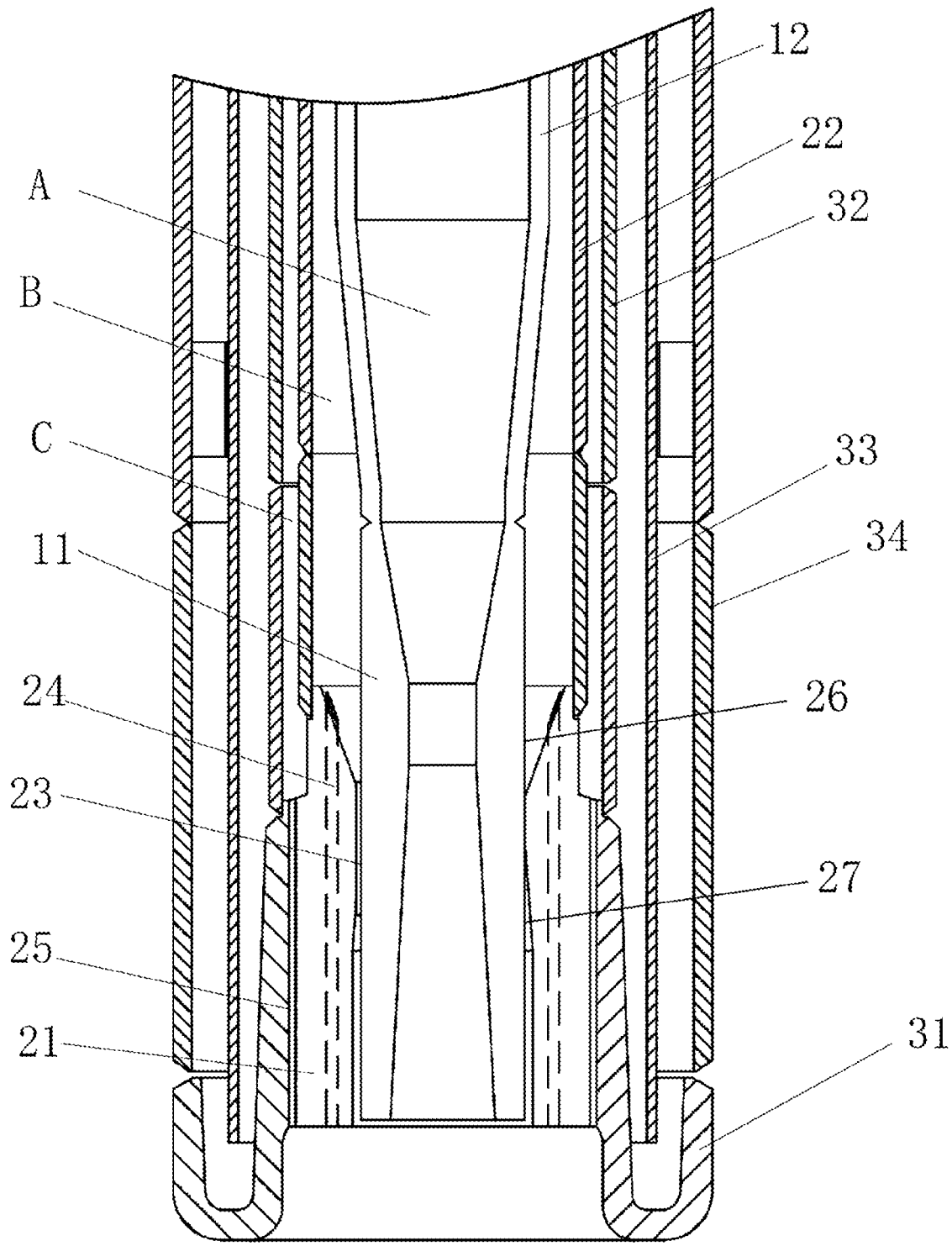
FIG. 2 is a structural schematic diagram of nozzles of an oxygen lance of the present invention.
Figure 3:
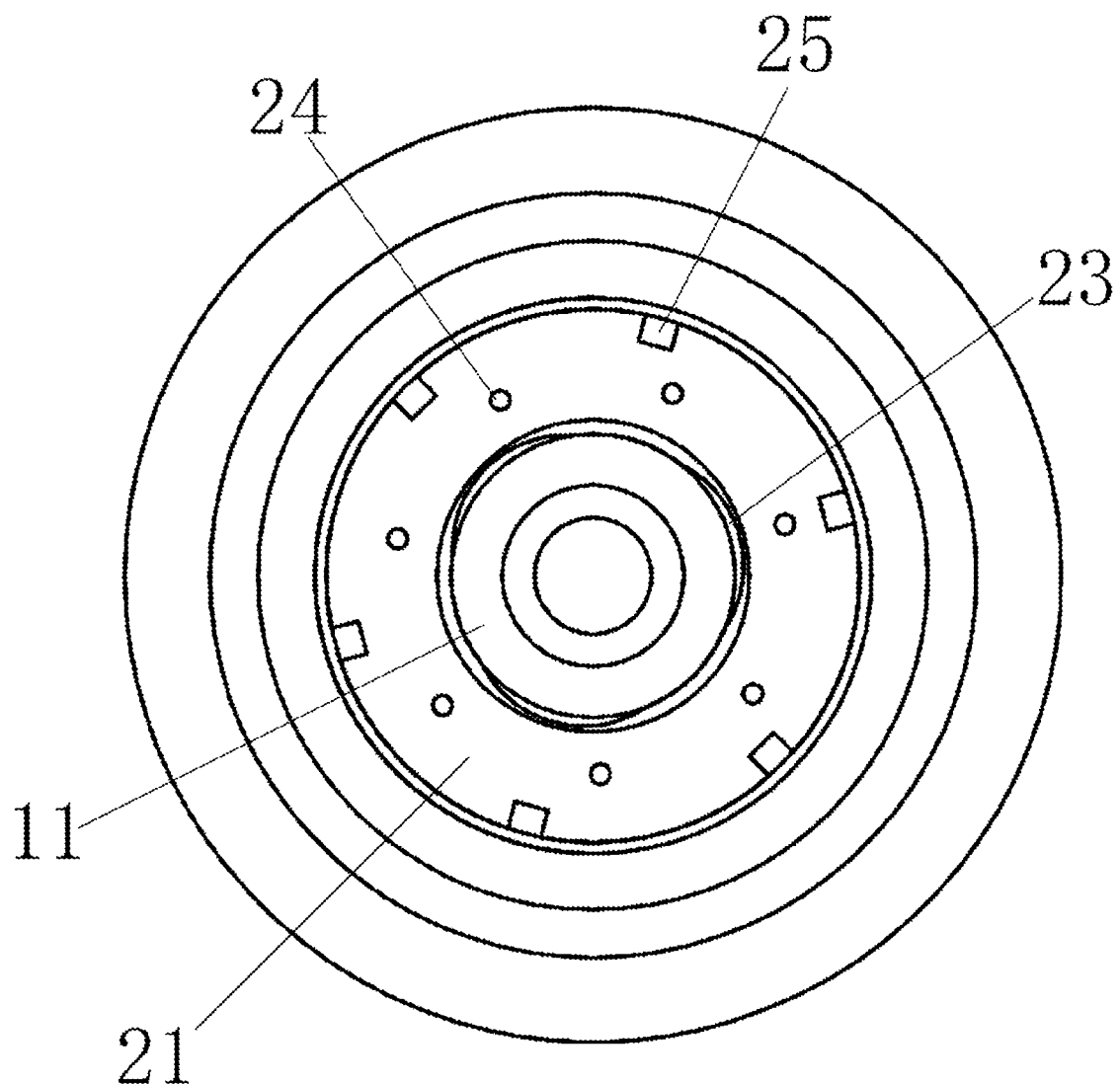
FIG. 3 is a bottom view of nozzles of the present invention.

As shown in FIG. 1 to FIG. 3, the present invention provides a coaxial dual supersonic oxygen flow cluster oxygen lance being comprised of spray heads and multiple-layer coaxial casting, comprising an inner layer circular-hole supersonic nozzle assembly, an outer layer water-cooled casting assembly and a middle layer annular-hole supersonic nozzle assembly which are coaxially arranged, wherein the middle layer annular-hole supersonic nozzle assembly is arranged between the inner layer circular-hole supersonic nozzle assembly and the outer layer water-cooled casting assembly; the circular-hole supersonic assembly generates a first beam of supersonic oxygen jets, and the annular-hole supersonic assembly generates a second beam of supersonic oxygen jets surrounding the first beam of supersonic oxygen jets; and the second beam of supersonic oxygen jets and the first beam of supersonic oxygen jets are in the same direction, and the second beam of supersonic oxygen jets and the first beam of supersonic oxygen jets are independently supplied with gas, and are independently adjusted.

Specifically, the second beam of supersonic oxygen jets are formed by multi-beam single beam of supersonic oxygen jets in the same direction as the first beam of supersonic oxygen jets, all single beam of supersonic oxygen jets are distributed on the periphery of the first beam of supersonic oxygen jets in the center of the first beam of supersonic oxygen jets, and the second beam of supersonic oxygen jets formed after combination are coaxial with the first beam of supersonic oxygen jets, to form coaxial dual supersonic oxygen jets.

The second beam of supersonic oxygen jets and the first beam of supersonic oxygen jets are separately supplied with oxygen; and the parameters for the second beam of supersonic oxygen jets and the first beam of supersonic oxygen jets are independently adjusted, comprising flow, pressure regulation, etc.; therefore, the present invention can flexibly adjust the flow of an oxygen lance under the condition of supersonic jets, and can meet the different requirements of an electric furnace at the high scrap ratio for an oxygen system during the smelting periods at different working conditions, thereby improving smelting efficiency of the electric furnace, reducing consumption and shortening smelting periods. The cluster supersonic jets can be realized at various flow rates, which prolong the jet distance of oxygen and enable the oxygen lance to be installed at a higher position from a molten steel level, thus reducing the damage of high temperature radiation and slag liquid to the lance and prolonging service life of the oxygen lance.

In one embodiment, the inner layer circular-hole supersonic nozzle assembly has a first oxygen channel A and a Lavalle orifice in the center, which are used for inletting oxygen and generating the first beam of supersonic oxygen jets through the Lavalle orifice; a second oxygen channel B is formed between the inner layer circular-hole supersonic nozzle assembly and the middle layer annular-hole supersonic nozzle assembly, which is used for inletting the oxygen; and a supersonic spout is formed between the middle layer annular-hole supersonic nozzle assembly and the inner layer circular-hole supersonic nozzle assembly, which is used for generating a second beam of supersonic oxygen jets;

in one embodiment, the inner layer circular-hole supersonic nozzle assembly comprises a Lavalle spray head 11 and a first oxygen supply pipe 12 welded with the Lavalle spray head 11, wherein the Lavalle spray head 11 is made of copper, and the Laval orifice is formed in the center; and the first oxygen supply pipe 12 has a first oxygen inlet 48, which is used for being connected to an oxygen supply apparatus and providing oxygen flow.

In one embodiment, the middle layer annular-hole supersonic nozzle assembly comprises an annular-hole spray head 21 and a second oxygen supply pipe 22 welded with the annular-hole spray head 21; and the second oxygen supply pipe 22 is coaxially sleeved on a periphery of the first oxygen supply pipe 12, the second oxygen channel B is formed between the second oxygen supply pipe 22 and the first oxygen supply pipe 12, the Lavalle spray head 11 is inserted into the annular-hole spray head 21, an upper cavity 26 of a circular ring cone gradually reducing a cross sectional area and a lower cavity 27 of the circular ring cone gradually expanding a cross sectional area are formed between an inner profile of the annular-hole spray head 21 and an outer profile of the Lavalle spray head in an airflow direction, and the upper cone cavity and the lower cone cavity with variable cross sectional area are connected by a plurality of independent oxygen slotted holes with equal cross sectional area, wherein the equal cross sectional area refers to an area where a single oxygen slotted hole remains unchanged in a length direction of the hole and each oxygen slotted hole has the equal cross sectional area. The multiple independent oxygen slotted holes are centered with common axes of the upper cavity 26 of the circular ring cone and the lower cavity 27 of the circular ring cone, wherein the upper cavity 26 of the circular ring cone, the oxygen slotted holes and the lower cavity 27 of the circular ring cone form a supersonic spout of the annular-hole spray head 21, which is used for generating the second beam of supersonic oxygen jets.

In one embodiment, the oxygen slotted holes are radially distributed as at least two layers along the annular-hole spray head; and specifically, the oxygen slotted holes at least comprise inner layer oxygen notches 23 and epoxy circular holes 24 on the periphery of the oxygen notch 23, wherein the annular-hole spray head 21 has a hollow structure, an inner profile is provide with the oxygen notch 23 for oxygen outflow, the oxygen notches 23 correspond to the position of a throat, and the oxygen notches 23 are circumferentially distributed along the inner profile of the annular-hole spray head 21, wherein the oxygen jets sprayed from the single oxygen notch 23 are in the same direction and parallel to the oxygen jets sprayed from the Lavalle spray head 11, and all the oxygen notches 23 are centered in the center of the Lavalle spray head 11, and are distributed uniformly. The epoxy circular holes 24 are circumferentially and uniformly distributed along the annular-hole spray head 21, inlets of the epoxy circular holes 24 and the oxygen notches 23 are in communication with the second oxygen channel B, and the oxygen flows sprayed from the epoxy circular holes 24 are wrapped around the periphery of the supersonic oxygen flow sprayed from the oxygen notches 23, so that the second beam of supersonic oxygen jets are cluster jets, that is, the second beam of supersonic oxygen jets comprise oxygen flows sprayed from the epoxy circular holes 24 and the oxygen notches 23.

In one embodiment, the outer layer water-cooled casting assembly comprises a water-cooled inner pipe 32, a middle casting 33, a water-cooled outer pipe 34 and a hollow annular seal head 31, the water-cooled inner pipe 32 and the water-cooled outer pipe 34 are respectively welded with the annular seal head 31, and the middle casting 33 separates a water inlet channel from a water return channel. The water inlet channel is formed between the middle casting 33 and the water-cooled inner pipe 32, and a water return channel is formed between the middle casting 33 and the water-cooled outer pipe 34 to form a closed cooling water loop. The water inlet channel is connected with a water inlet pipe 35, and the water return channel is connected with a water outlet pipe 36. The annular-hole spray head 21 is inserted into the seal head 31, and a gas channel C is formed between the second oxygen supply pipe 22 and the water-cooled inner pipe 32.

An outer profile of the annular-hole spray head 21 is provided with gas slotted holes 25 for gas outflow along the direction parallel to an axis, and the gas slotted holes 25 are circumferentially and uniformly distributed along the annular-hole spray head 21. The gas slotted holes 25 form gas spouts, and the gas inlets of the gas slotted holes 25 are in communication with the gas channel C.

The epoxy circular holes 24 cause the oxygen in the second oxygen channel B to be shunted to be outer casting gas, and the gas sprayed from the gas spout is burned with the oxygen from the epoxy circular holes 24 to generate high-speed lean expanded airflow, and further make an envelope on the second beam of supersonic oxygen jets and make a centripetal compression to form cluster jets, thereby increasing length of the oxygen jets and impact stirring action on the molten steel level, and improving solubility of the oxygen in the molten steel.

In one embodiment, the water-cooled inner pipe 32 can slide relative to the water-cooled outer pipe 34, and an O-shaped sealing ring 47 is passed through between the water-cooled outer pipe 34 and the water-cooled inner pipe 32. The water-cooled inner pipe 32 can slide in the water-cooled outer pipe 34 through the O-shaped sealing ring 47, to eliminate internal stress of the water-cooled outer pipe 34 caused by the deformation of thermal expansion and contraction.

In one embodiment, a tail pipe 41 is coaxially arranged on the peripheries of the first oxygen supply pipe 12 and the second oxygen supply pipe 22, a first end of the tail pipe 41 is connected to the water-cooled outer pipe 34 by a first sealing flange 45, and a second end of the tail pipe 41 is installed with a second sealing flange 46 for connection; the first oxygen supply pipe 12 passes through the second sealing flange 46 and is supported on the second sealing flange 46, thereby achieving sealing and positioning at the same time; the tail pipe 41 is connected with an oxygen inlet 43 and a gas inlet 44 which are separated from each other; and the gas inlet 44 is in communication with the gas channel C, and the oxygen inlet 43 is in communication with the second oxygen channel B.

Specifically, an inner wall of the tail pipe 41 is provided with a spacing ring 42 for separating the gas inlet from the oxygen inlet, the second oxygen supply pipe 22 is inserted into the spacing ring 42 and is welded with the spacing ring 42, and the second oxygen supply pipe 22 and the spacing ring 42 separate the second oxygen channel B from the gas channel C.

In the present invention, the first beam of supersonic oxygen jets can generate oxygen flow at the speed of more than Mach 2, and the second beam of supersonic oxygen jets can generate the oxygen flow at the speed of more than Mach 1.5; and the speed of the airflow generated by the burning and expansion of the gas can reach more than Mach 1.

A usage method of the coaxial dual supersonic oxygen flow cluster oxygen lance of the present invention is as follows:

after the oxygen lance is put into use, circulating cooling water is injected into the outer layer water-cooled casting assembly, the cooling water is flown into a water-cooled casting inlet, and the cooling water is discharged from a water-cooled casting outlet, to form a continuous cooling water protective jacket; All pipelines are fed with purge gas for protection and cooling all the time when no oxygen or gas is inlet. During the period of the dephosphorization of electric furnace smelting at a high hot metal ratio, the oxygen inlet 43 (second oxygen channel B) of the annular-hole supersonic nozzle assembly is fed with 0.8 to 1.2 MPa of high-pressure oxygen, to form low-flow supersonic cluster oxygen jets at Mach 1 to 1.5, the flow is controlled at 500 to 1,500 $Nm^3/h$, and a large amount of ferric oxide is produced at a molten iron level; and the gas inlet 44 of the annular-hole supersonic nozzle assembly is fed with 0.3 MPa of natural gas, to form supersonic oxygen jets produced through the isolation of lean-burning gas. During the period of the slag forming of electric furnace smelting at a high hot metal ratio, the oxygen pipe (first oxygen channel A) of the circular-hole supersonic nozzle assembly is fed with 1.0 to 1.5 MPa of high-pressure oxygen, to form supersonic jets at Mach 1.8 to 2.2, the flow is controlled at 1,500 to 3,500 $Nm^3/h$, and foamed slags are formed rapidly; and during the period of the decarburization of electric furnace smelting at a high hot metal ratio, the first oxygen supply pipe 12 of the circular-hole supersonic nozzle assembly is fed with 1.0 to 1.5 MPa of high-pressure oxygen, and the flow is controlled at 1,500 to 3,500 $Nm^3/h$; at the same time the second oxygen supply pipe 22 of the annular-hole supersonic nozzle assembly is fed with 0.8 to 1.2 MPa of high-pressure oxygen, and the flow is controlled at 500 to 1,500 $Nm^3/h$; and the gas inlet 44 of the annular-hole supersonic nozzle assembly is fed with 0.3 MPa of natural gas, to form high-flow supersonic cluster oxygen jets. The molten steel is stirred and fast decarburization is conducted.

The gas supply of the coaxial dual supersonic oxygen flow oxygen lance is realized by the following method: according to the smelting process requirements of the electric furnace, a high-pressure gas source of a gas supply pipe network is adjusted to the pressure required by a smelting process by a gas supply valve station, and the gas flow, pressure and time of each route of oxygen, the gas and the purge gas that are injected into the oxygen lance by the gas supply valve station are controlled.

The present invention can flexibly adjust the flow of the oxygen lance, and can satisfy different requirements of the electric furnace at the high steel scrap ratio for the oxygen system during the smelting period at different working conditions, thereby improving smelting efficiency of an electric furnace, reducing consumption and shortening smelting periods.

Moreover, the cluster supersonic jets can be realized at various flow rates, which prolong the jet distance of oxygen and enable the oxygen lance to be installed at a higher position from a molten steel level, thus reducing the damage of high temperature radiation and slag liquid to the lance and prolonging service life of the oxygen lance.

The above embodiments are only used for exemplarily describing the principles and effects of the present invention rather than limiting the present invention. Any of those skilled in the art can modify or change the above embodiments without deviating from spirits and categories of the present invention. Therefore, all equivalent modifications or changes completed by ordinary intellectuals in the technical field without departing from spirits and technical thoughts revealed in the present invention shall still be covered by claims of the present invention.

The invention claimed is:

1. A coaxial dual supersonic oxygen flow cluster oxygen lance, characterized by comprising: an inner layer circular-hole supersonic nozzle assembly, an outer layer water-cooled casting assembly, and a middle layer annular-hole supersonic nozzle assembly arranged between the inner layer circular-hole supersonic nozzle assembly and the outer layer water-cooled casting assembly, wherein the circular-hole supersonic assembly generates a first beam of supersonic oxygen jets and the annular-hole supersonic assembly generates a second beam of supersonic oxygen jets surrounding the first beam of supersonic oxygen jets; and the second beam of supersonic oxygen jets and the first beam of supersonic oxygen jets are in the same direction, and the two beams of supersonic oxygen jets are independently supplied with gas and are independently adjusted;

the inner layer circular-hole supersonic nozzle assembly comprises a Lavalle spray head and a first oxygen supply pipe welded with the Lavalle spray head, wherein the first oxygen supply pipe forms a first oxygen channel, and an inner profile surface of the Lavalle spray head forms a supersonic spout which is used for generating the first beam of supersonic oxygen jets;

the middle layer annular-hole supersonic nozzle assembly comprises an annular-hole spray head and a second oxygen supply pipe welded with the annular-hole spray head; the second oxygen supply pipe is coaxially sleeved on a periphery of the first oxygen supply pipe to form a second oxygen channel, the Lavalle spray head is inserted in the annular-hole spray head, an upper cavity of a circular ring cone gradually reducing a cross sectional area and a lower cavity of the circular ring cone gradually expanding a cross sectional area are formed between an inner profile of the annular-hole spray head and an outer profile of the Lavalle spray head in an airflow direction, the upper cone cavity and the lower cone cavity with variable cross sectional areas are connected by a plurality of independent oxygen slotted holes with equal cross sectional area, the plurality of independent oxygen slotted holes are uniformly distributed circumferentially about an axis of an upper cone and a lower cone, and the upper cavity of the circular ring cone, the oxygen slotted holes and the lower cavity of the circular ring cone form a supersonic spout of the annular-hole spray head, which is used for generating a second beam of supersonic oxygen jets.

2. The coaxial dual supersonic oxygen flow cluster oxygen lance according to claim 1, characterized in that: the oxygen slotted holes are radially distributed as at least two layers along the annular-hole spray head.

3. The coaxial dual supersonic oxygen flow cluster oxygen lance according to claim 1, characterized in that: the outer layer water-cooled casting assembly comprises a water-cooled inner pipe, a middle casting, a water-cooled outer pipe and an annular seal head, the water-cooled inner pipe and the water-cooled outer pipe are respectively welded with inner and outer surfaces of the annular seal head, the middle casting is separated from a water inlet channel and a water return channel, the annular-hole spray head is inserted into the annular seal head, and a gas channel is formed between the second oxygen supply pipe and the water-cooled inner pipe.

4. The coaxial dual supersonic oxygen flow cluster oxygen lance according to claim 3, characterized in that: an outer profile of the annular-hole spray head is provided with gas slotted holes for gas outflow along a direction parallel to an axis, and the gas slotted holes are circumferentially distributed along the annular-hole spray head and are in communication with the gas channel.

5. The coaxial dual supersonic oxygen flow cluster oxygen lance according to claim 3, characterized in that: the water-cooled inner pipe can slide relative to the water-cooled outer pipe, and an O-shaped sealing ring is passed through between the water-cooled outer pipe and the water-cooled inner pipe.

6. The coaxial dual supersonic oxygen flow cluster oxygen lance according to claim 3, characterized in that: the annular-hole spray head, the Lavalle spray head and the annular seal head are made of copper.

7. The coaxial dual supersonic oxygen flow cluster oxygen lance according to claim 3, characterized in that: the coaxial dual supersonic oxygen flow cluster oxygen lance further comprises a tail pipe, the tail pipe is coaxially arranged outside of a first oxygen supply pipe and a second oxygen supply pipe, a first end of the tail pipe and the water-cooled inner pipe are connected by a first sealing flange, a second end of the tail pipe is connected with a second sealing flange for sealing, the first oxygen supply pipe passes through and is supported on the second sealing flange, and the tail pipe is connected with an oxygen inlet and a gas inlet which are separated from each other; and the gas inlet is communicated with the gas channel and the oxygen inlet is communicated with the second oxygen channel.

8. The coaxial dual supersonic oxygen flow cluster oxygen lance according to claim 7, characterized in that: an inner wall of the tail pipe is provided with a spacing ring for separating the gas inlet from the oxygen inlet, and the second oxygen supply pipe is inserted into the spacing ring and is welded with the spacing ring.

* * * * *